United States Patent Office 2,986,452
Patented May 30, 1961

2,986,452
ANALYTICAL METHOD
Ronald W. Marek, Tonawanda, N.Y., assignor to Olin Mathieson Chemical Corporation, a corporation of Virginia
No Drawing. Filed May 25, 1959, Ser. No. 815,323
1 Claim. (Cl. 23—230)

This invention relates to a novel method for determining the cyanuric acid content of mixtures.

Chlorinated cyanuric acid is useful as a dry bleach and can be prepared by chlorinating the sodium salt of cyanuric acid. For this and other reasons cyanuric acid is produced by various processes generally starting with urea or biuret. Known processes are those whereby urea or biuret is heated in a solvent such as phenol, cresol or an amide such as dimethylformamide. The precipitated product obtained in this way generally contains biuret, ammelide and cyanuric acid. The analysis of the product for cyanuric acid content is complicated by the ammelide. Simply titrating the mixture with a base gives the total acid content including ammelide and is not indicative of cyanuric acid content unless no ammelide or other acidic substance is present, which is seldom the case. The procedure described below is specific for cyanuric acid in the commonly produced reaction mixtures containing biuret, ammelide and cyanuric acid.

The procedure for the analysis comprises 9 main steps:

(1) Dissolve the sample in hot water to make a solution containing about 0.1% to 5% by weight cyanuric acid. About 1% cyanuric acid is preferred.

(2) A volume, equal to about ½ the volume of the solution prepared in step 1, of 2.0 to 5.0 normal alkali metal acetate is added as a buffer to the solution of step 1 after it has been cooled to room temperature. It is preferable to use a ratio of about 15 to 30 moles of acetate per mole of cyanuric acid in the sample.

(3) A soluble copper salt such as sulfate, chloride, or acetate solution, containing about 0.2 to 0.6 mole of the salt per liter, is added with stirring to the solution of step 2. It is preferred to add an amount of this solution to make the mole ratio of copper to cyanuric acid between 0.5 and 2 moles of copper per mole of cyanuric acid. This mixture is stirred for 20 to 40 minutes at room temperature and filtered.

(4) The precipitate is washed repeatedly with small volumes of water until the wash water is no longer a blue color. After washing, the precipitate is transferred to a beaker with a volume of water equal to about 25 to 200 times the volume of the precipitate.

(5) Sulfuric acid, preferably 10 to 20 normal, is slowly added to the aqueous slurry of the precipitate until it decomposes, i.e. loses its purple color and becomes white. This generally requires about 5 to 12 moles of sulfuric acid per mole of cyanuric acid originally in the sample.

(6) The solution from step 5 is diluted with 2 to 4 times its volume with water and neutralized with concentrated ammonium hydroxide. This is accomplished by slowly adding the ammonium hydroxide until the solution first becomes dark blue.

(7) The solution from step 6 is acidified with glacial acetic acid to a pH of about 2 to 5.

(8) A water-soluble, solid iodide, such as sodium and preferably of potassium, is added to the solution of step 7 until the initially clear solution becomes cloudy and then clear again. It will have a deep red color caused by triiodide ion.

(9) The solution of step 8 is finally titrated with standard sodium thiosulfate to the starch end point.

The percent by weight of the sample which is cyanuric acid is obtained by the formula

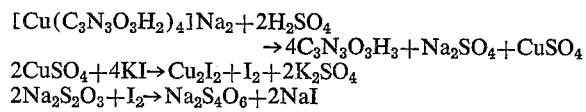

wherein 516.4 is 4 times the molecular weight of cyanuric acid and 1.041 is a constant peculiar to this analysis. It was determined by analysing mixtures of known cyanuric acid content. The 100 converts the fraction to percent. In the precipitate, each atom of copper is combined with 4 molecules of cyanuric acid, according to the formula

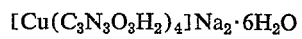

given by Ostrogovich et al. in Atti V congr. nasl. chim. pura applicata, Rome, Pt. 1, 431–6 (1936); Chemical Abstracts 31, 5289[7]. The equations involved are:

$[Cu(C_3N_3O_3H_2)_4]Na_2 + 2H_2SO_4$
$\rightarrow 4C_3N_3O_3H_3 + Na_2SO_4 + CuSO_4$
$2CuSO_4 + 4KI \rightarrow Cu_2I_2 + I_2 + 2K_2SO_4$
$2Na_2S_2O_3 + I_2 \rightarrow Na_2S_4O_6 + 2NaI$ One mole of thiosulfate thus equals 4 moles of cyanuric acid.

It is convenient in the above procedure to know the approximate cyanuric acid content of the sample. The sample can be assumed to contain 50 percent by weight of cyanuric acid if no closer estimate is known.

The method described by this invention was developed for samples having a cyanuric acid content of about 50% to 100%. Between these limits the analyses will not vary more than 1% from each other, and the average cyanuric acid content found will be within 1% of the actual value.

The following is an example of a preferred procedure of this method:

Example I

A sample was made up containing 1.7531 grams of cyanuric acid, 0.0614 gram of ammelide and 0.1905 gram of biuret. This entire sample was dissolved by boiling in 200 milliliters of distilled water. After cooling the solution to room temperature, 80 milliliters of water containing 0.4 mole of sodium acetate was added to it. Two hundredths of a mole of cupric sulfate was also added to the solution with stirring. After an additional stirring period of 30 minutes the precipitate was filtered and washed 3 times with 20 milliliters of distilled water. It was decomposed by adding 10 milliliters of 18 normal sulfuric acid to the mixture which was then diluted to 300 milliliters with water. Concentrated ammonium hydroxide was added to the mixture until the liquid turned deep blue after which 5 milliliters of glacial acetic acid was added thereto. Seventy grams of potassium iodide was added to the mixture which was stirred and then titrated to the starch end point with 0.0996 normal sodium thiosulfate. The analysis showed that the original sample contained 86.87 percent cyanuric acid while the calculated value was 87.44%.

Example II

A flask equipped with a stirrer, thermometer and reflux condenser followed by a cold condenser open to the atmosphere was charged with 240 grams of urea and 240 grams of dimethylformamide. This mixture was heated for 4.5 hours at about 170° C., allowed to cool overnight and again heated the following day at about 160° C. for 7.5 hours. After cooling the mixture it was filtered, washed and the product was analysed for cyanuric acid content by the method of this invention. It contained 92.2 percent by weight of cyanuric acid. The yield of the reaction was 70.5 percent based on urea. Ammelide, biuret and urea were the major contaminants. When this product was titrated with dilute sodium hydroxide, the acid content was found to be 98 percent by weight. Infra red analysis of the ammelide content of the product indicated that all of the ammelide titrated as cyanuric acid.

What is claimed is:

Method of determining the cyanuric acid content of a mixture which comprises dissolving a measured sample of the mixture in water, adding sodium acetate and then a soluble copper salt thereto, separating and washing the resulting precipitate, decomposing the precipitate in aqueous sulfuric acid, neutralizing the mixture with ammonium hydroxide until the liquid becomes a deep blue, acidifying the mixture with acetic acid to a pH between 2 and 5, adding a soluble iodide to the mixture until the liquid becomes a clear red color and finally titrating the resulting mixture with standard sodium thiosulfate to the starch end point.

References Cited in the file of this patent

Ostrogovich: Atti congr. nasl. chim. pura applicata, Rome, Pt. 1, pages 431 to 436 (1936).